United States Patent Office

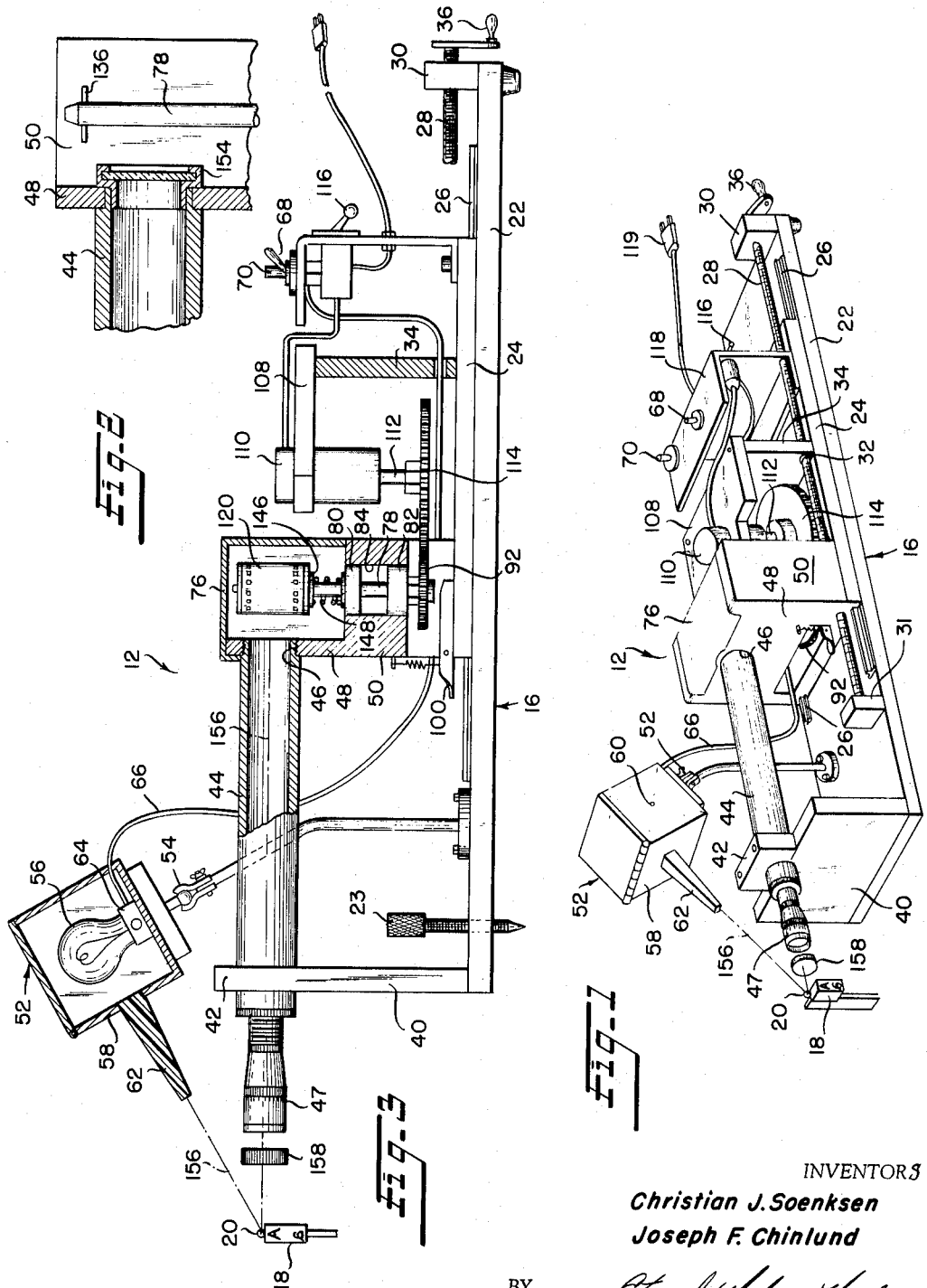

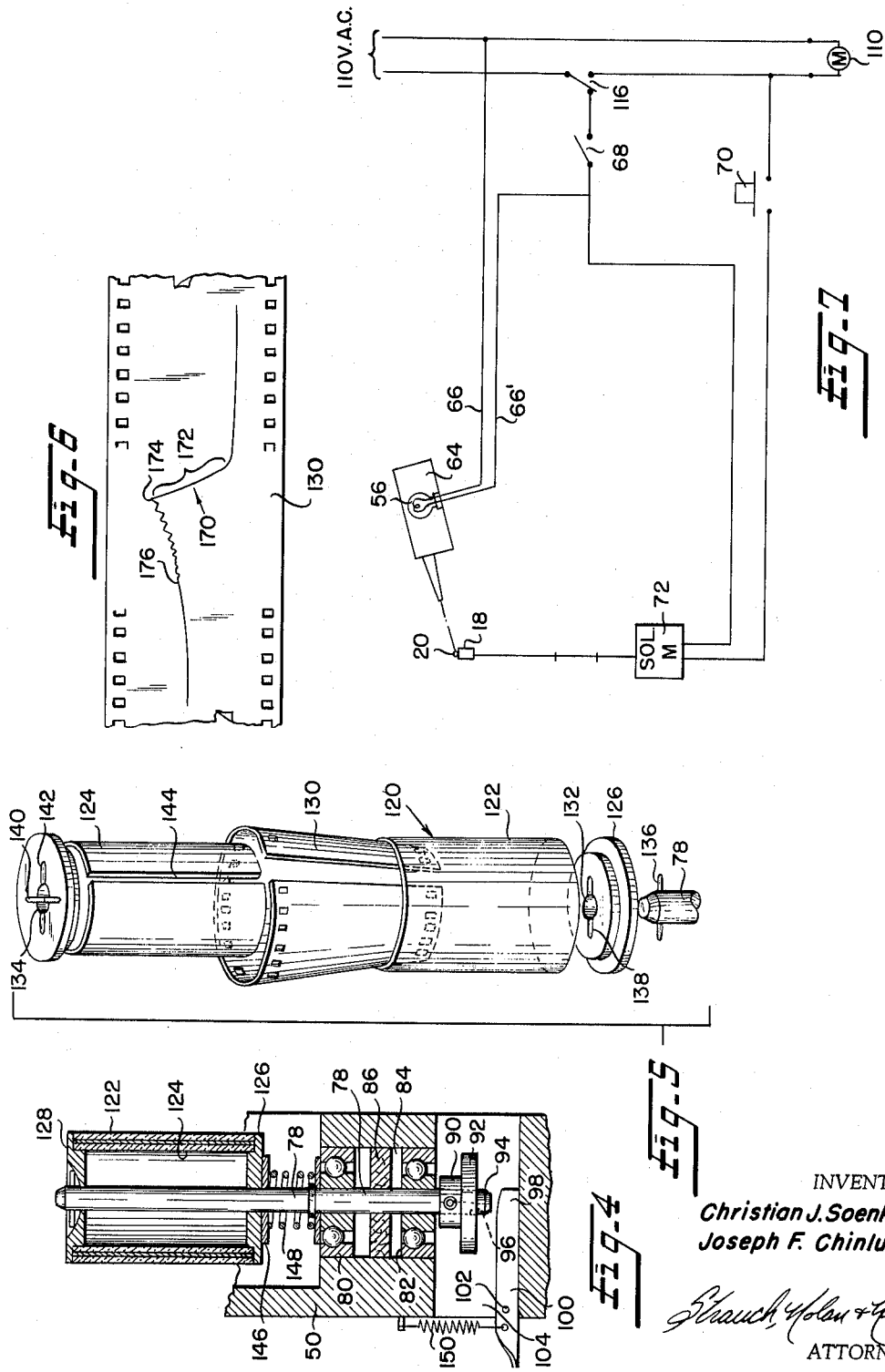

3,256,525
Patented June 14, 1966

3,256,525
HIGH SPEED DRUM CAMERA (STREAK PHOTOGRAPHY)
Christian J. Soenksen, Mundelein, and Joseph F. Chinlund, Northbrook, Ill., assignors to SCM Corporation, New York, N.Y., a corporation of New York
Filed May 27, 1963, Ser. No. 283,409
16 Claims. (Cl. 346—108)

This invention relates to the field of photography and more particularly to apparatus and method for accomplishing streak photography, a photographic process whereby information as to the speed, vibration, impact, bounce and other characteristics of a moving object being photographed can be recorded in the form of a graphic light streak or curve on film by apparatus of the type which uses a length of negative film encased in a small drum.

Although the concept of streak photography and the use of drum cameras to accomplish the same are old, practical utilization of drum cameras in the art of high speed streak photography is relatively new. Existing camera models, available today, for obtaining streak photography records performed with a high degree of speed and precision. However, these drum cameras consist of intricate mechanisms and are highly developed and complex instruments. They are also rather large and cumbersome.

Many cameras used in streak photography operate on the rotating prism principle and many others operate with a film drum, however the drums are on a much larger scale than the present invention. In the present invention a drum camera is used, however, the film drum is very small, it is easy to load and is so inexpensive to manufacture that many drums can be made up as preloaded cartridges, stored close at hand for instant use.

When light beams are used as a recording medium, usually the beams are reflected from the component being studied. Various devices have been used in prior known streak photography apparatus to reflect light into previously known drum cameras, some of which are light colored paint spots, machined grooves, steel pins, etc. These methods are still being used in the most expensive models of drum cameras but the results are a rather fuzzy and broad streak that must be compensated for by exposing on a large sheet of film which in turn necessitates using a much larger film drum.

In this invention the combination of an inexpensive light box for producing concentrated parallel light beams of high intensity and a tiny steel ball, such as a ball bearing, for a reflector have proved so highly successful that the drum camera can be used as efficiently in normal incident light as in a dark room without loss of quality in the exposure. The use of the spherical surface of the ball to reflect light presents, from a specific direction, only an extremely small area reflecting the light in that direction, and gives an effect of concentrating the beamed light into the camera with such pinpoint intensity that a very sharply defined streak is recorded on the film. The resulting record can be readily analyzed directly from the short strip of film of 35 mm. size or, if desired, the image can be enlarged many times with still better results.

The dimensions of most known drum cameras make them impractical for the smaller projects and their extreme high cost puts them far beyond the financial scope of the average research laboratory. Conversely, the simplicity of components and ease in operation of the apparatus of the present invention result in a very low over-all cost, and coupled with its small size and portability, make it extremely practical for laboratory or research use.

Accordingly, a primary object of this invention resides in the provision of a novel low cost, compact apparatus for obtaining motion characteristic records by means of streak photography.

A further object of this invention resides in the provision of a novel method of obtaining streak photography records by prefocusing, to a desired plane, a reference light source reflected from a spherical mirror on a component being studied and subsequently causing a desired motion of the component simultaneously with causing a high peak light source to occur from the same position as the reference light source while having a continuously rotating film strip disposed in intersection with the prefocus plane.

A still further object of this invention resides in the provision of a novel low cost, portable, yet highly accurate drum camera for use in the study of motion characteristics by streak photography.

Still another object resides in the provision of a novel drum camera for recording high speed motion characteristics of devices being photographed.

Another important object resides in the provision of a novel drum camera apparatus including a highly concentrated parallel light source used in conjunction with a spherical reflecting surface for accomplishing minimum area maximum brilliance resulting in much sharper definition of line or streak quality, without the high degree of criticality in aiming which has been required with other apparatus.

A further object resides in the provision of a drum camera capable of recording, on negative film, motion characteristics of parts of substantially any device capable of being photographed such as the paths of levers and cams, cam followers, rollers, impact devices, etc.

A further object resides in the provision of a novel high speed drum camera capable of inexpensively recording the impact characteristics of mechanical devices such as a type pallet striking a platen. In conjunction with this object, another object of this invention resides in a novel drum camera having provision for clearly recording rebound and vibration characteristics of objects such as that previously mentioned.

Further novel features and other objects of this invention will become apparent from the following detailed description, discussion and the appended claims taken in conjunction with the accompanying drawings showing a preferred structure and embodiment, in which:

FIGURE 1 is a perspective view of the streak photography apparatus and illustrates the relationship between the drum camera assembly, the light source and the object being photographed. The object depicted is a type pallet and will be referred to as such throughout the text, and is used in the illustrative example because excellent streak photographs of such objects have actually been recorded with the illustrated construction;

FIGURE 2 is an enlarged, detail section view of the lens tube showing the focusing disc in position for focusing the reflected light to a proper plane prior to insertion of a film drum into the camera body;

FIGURE 3 is a side elevation partially sectioned to show the relative positions of the various components of the apparatus including light source and drum camera assembly;

FIGURE 4 is an enlarged detail section view of the film drum, assembled and mounted on the drum shaft, and also illustrates the shaft locking device;

FIGURE 5 is an exploded view of the film drum components and the drum shaft, the drum components being illustrated in the order of their assembly;

FIGURE 6 is a view of a developed film strip showing an exemplary streak recording, the streak reading from right to left and illustrating the start of travel, the impact and the rebound characteristics of a type pallet striking the platen of a typewriter or teletypewriter; and FIGURE 7 is a schematic electric circuit for the photographic apparatus of FIGURE 1.

Referring now to the drawings, in which like numerals are used throughout to designate like parts in the several views, and more particularly to FIGURE 1, the streak photography apparatus includes a camera assembly 12 and light box 52 with a base, or support, structure 16 as it may be used in one application of the invention, that is, to record and measure vibrations resulting when a high speed printer type pallet 18 undergoes an impact print action, by means of reflected light from a polished sphere 20 mounted on the type pallet. To clearly illustrate the pallet and the camera assembly, the camera is depicted as rotated 90° around the lens tube from the position actually used. The direction of motion being recorded should be parallel with the film drum axis or, alternatively, secondary flat mirrors can be used to change the direction of reflected light or to obtain multiple simultaneous dimension records of motion in several directions on one film strips.

The apparatus base 16 is used primarily for mounting the camera assembly 12 in an adjustable manner to enable aiming and focus. It consists of a flat elongate base plate 22 which supports the simple drum camera assembly 12 on its upper surface and includes a mechanism to adjustably shift the complete camera assembly lengthwise of the base plate. To this end the components of the drum camera assembly 12 are mounted upon a smaller subassembly base plate 24 having straight grooves or other devices in its lower surface which cooperate with tracks 26 rigidly fixed along the upper surface of main base plate 22, permitted a guided relationship of the camera assembly during fore and aft shifting movements.

To accomplish fore and aft shifting of the camera assembly 12, a long screw threaded adjusting rod 28 is axially maintained and rotatably journalled in two bearing blocks 30 and 31 with its axis parallel to the stretches of track 26. The rod projects through the camera assembly 12 and is engaged with an internally threaded opening 32 in a support wall 34 rigid with the camera assembly. A hand crank 36, non-rotatably fixed on the rear end of rod 28, enables operator actuation of the adjusting rod 28 whenever it is necessary to shift the camera.

An upright front plate 40 is fixed to the forward end of base plate 22 and, together with a guide block 42, provides a cylindrical guide and supports bracket for permitting reciprocal movement of the camera lens tube 44 whenever the camera is shifted on tracks 26. The rear end of the lens tube 44 projects into and is secured as by screw threads in an opening 46 in the front wall 48 of camera body 50 which in turn is securely fastened to the subassembly base plate 24. Threadedly fastened on the front end of the lens tube 44 is a conventional 8 mm. lens system 47. Other components of the camera assembly 12 will be described in detail hereinafter, it being clearly understood at this stage of the description that manipulation of the adjusting screw 28 will shift the complete camera assembly either forward or backward and the barrel shaped lens tube 44 will thus be concurrently shifted in the same direction along its guide bracket 40, 42, enabling focusing of the camera relative to a unit being photographed. Additional focusing could be accomplished, if desired, by auxiliary adjustment of the lens system 47.

A light source is used in conjunction with the camera and is incorporated in a light box 52 which can be conveniently mounted on a swivel support 54 secured to the main base plate 22, as shown, or the light box can be mounted by other means, e.g., on a conventional independent tripod support or on a clamp bracket, both of which devices are well-known and commercially available light source support arrangements. The light box 52, which houses a bulb 56, consists of a small box of square or rectangular design with a door 58 located on one side to permit bulb substitution after focusing, as will be further described, and also bulb replacement after exposure has been made. A small hole 60 is centrally located in a side wall of the light box for pinpoint emission of substantially parallel light beams from the bulb within the box. Also located in a side of box 52, which conveniently is also the door 58, is a long, tapered square rod 62 made of a transparent material such as methyl methacrylate polymer, known as "Lucite." All four sides of the light directing rod 62 are painted a flat black so that total internal reflection can be attained. The small hole 60 is for use on general work where the part being photographed is in the open and where light focusing or concentrated directing is not critical. The long tapered rod 62 is used where the photographed part is somewhat obscured or hidden and the light beam must be accurately directed into the interior of a machine to attain maximum reflection. The light loss through either the hole 60 or rod 62, when the other one is being used, is negligible and has no affect on the quality of the photograph being made.

Fixed inside of the light box 52 is a standard incandescent light bulb socket 64 with electrical input leads 66 and 66' connected to the socket terminals. During focusing, as will be described, an incandescent light bulb (not shown) is placed in the socket 64 to provide a constant source of light beams. After the equipment is ready and before the streak photograph is to be taken, the standard bulb is removed and replaced by a high speed, high peak type of flash bulb 56, such bulbs being well-known and commercially available.

The leads 66 and 66' from bulb socket 64 are connected in the dual switch circuit shown in FIGURE 7. Through an off-on focusing switch 68, leads 66, 66' are connected to a 110 volt A.C. source to enable an incandescent bulb to be turned "on" to serve as a constant focusing light source. When the flash bulb 56 is inserted into socket 64 the switch 68 of course must be "off," however the flash bulb can be triggered by depressing switch 70 which completes a series circuit from one side of the 110 volt A.C. source, through the flash bulb 56 and through a pallet operator 72 back to the other side of the 110 volt A.C. source. Pallet operator 72 can be a high speed solenoid or it may be an electrical solenoid operated triggering device enabling mechanical pallet operation. In any event the series circuit controlled by switch 70 causes simultaneous operation of the pallet 18 and the flash bulb 56 and the action can be synchronized so that flash peak occurs during the time increment when the motion study of the pallet is desired.

Returning to the camera assembly 12 in FIGURES 1 and 3, the camera body 50 is a light-proof, box-like housing with a hinged top wall 76 serving as a closure and access cover to the interior of the housing 50. Shown in detail in FIGURE 4, an upright drum spindle 78 is journalled by two bearings 80 and 82, press fit into an opening 84 in the bottom wall of the camera housing 50. A felt washer 86 may be placed on spindle 78 between the two bearings and will suffice to light-proof the bearings and their retaining opening 84. The axis of spindle 78 is arranged to vertically intersect the axis of the lens tube 44 with the upper portion of the spindle disposed behind the lens tube opening 46 and within the camera body 50. Spindle 78 is axially maintained in its bearings 80 and 82 by means of a split ring clip 88 and the hub 90 of a small spur gear 92 non-rotatably secured by a set screw on the lower end 94 of the spindle. The lower spindle end 94 is slotted at 96 thereby enabling engagement by the blade end 98 of a spring loaded finger operated latching lever 100 which is pivoted on a horizontal post 102 fixed in the base wall 104 of camera housing 50. The latch device 100 aids in assembly of the drum on the spindle as will hereinafter more fully described.

The upright wall member 34 and a cooperating horizontal wall member 108, fixed to the camera sub-assembly base plate 24, provide a bracket mounting for an electric motor 110. The motor has a downwardly projecting motor shaft 112 to which is secured a large spur gear 114 meshed with gear 92. The large gear 114 has 3 times as many teeth as does gear 92 and thereby will provide spindle 78 with a 3:1 step-up ratio from the rotational speed of motor drive shaft 112. Spindle 78 drives a film drum 120 to be now described and therefore its rotational speed will determine the time base constant for the record to be made on the film. Motor 110 is controlled by a switch 116 located on a bracket 118 with the other two switches 68 and 70. Switch 116 may be a simple "on-off" switch or, as shown can be a double pole switch wired to by-pass the prefocused light source switch 68 whenever the motor circuit is turned on. Plug 119 is used to connect the camera assembly and light source to a 110 volt A.C. power source.

Turning now to FIGURES 4 and 5, the film drum 120 consists of four simple parts, an outer sleeve 122, an inner split sleeve 124, and two end discs 126 and 128 both of which, for convenience in manufacture, can be made identical although they each provide distinct structural cooperations in the final assembly.

The outer sleeve 122 and preferably, although not necessarily the inner sleeve 124 are made of a transparent material such as the aforedescribed "Lucite." Both end discs 126 and 128 can be made from similar plastic material or from a light weight metal. In any case, discs should be coated with a flat black paint or similar substance to eliminate undesirable light rays.

Holes 132 and 134 are centrally drilled in the respective end discs 126 and 128 so that they will slip over the drum shaft 78. A transverse, bayonet type lock pin 136 is fixed in the upper end of the drum shaft and, to permit discs 126 and 128 to slip onto the drum shaft, cross slots 138 and 140 are cut across the holes 132 and 134 completely through the respective discs 126 and 128. One disc will, but each disc can also include a second blind bottom slot transverse to the through slots, one such blind slot 142 being shown in the upper disc 128 in FIGURE 5.

A short strip of 35 mm. film 130 is the loading for drum 120, being rolled into a cylindrical shape, emulsion side one, and inserted into the outer sleeve 122. The inner split sleeve 124 is inserted into the outer sleeve by slightly squeezing the inner sleeve, closing the gap 144 where the sleeve is split to make its outside diameter small enough to fit inside of the outer sleeve and film strip. When released, the inner sleeve 124 will attempt to spring back to its original diameter and effectively compresses the film strip 130 between the outer sleeve 122 and the inner sleeve 124. A lower end disc 126 and an upper end disc 128 are then placed at and spigotted into respective ends of the assembled outer and inner sleeves 32 to complete the film drum assembly 120.

An assembled film drum 120 is placed on the drum shaft 78 with the lower end disc abutting a washer 146 which overlaps a small compression spring 148 which rests on a second washer. While placing the drum assembly on and locking it to the bayonet locking pin 136, the drum shaft locking lever 100 is held depressed, causing its end 98 to move upward into the slot 96 in the lower end of the drum shaft 78, thus preventing inadvertent rotational movement of the shaft. The complete film drum assembly 120 is forced downward against the force of the compression spring 148 until the spindle end and locking pin 136 projects through the slot 140 of upper disc 128 and clears the top surface of that disc. Then the film drum assembly 120 is rotated 90° in either direction until the blind slot 142 is aligned with the locking pin. The film drum assembly 120 is then released and compression spring 148 forces it upward so the blind slot 142 fits over the locking pin 136, effectively securing the film drum 120 for rotation with the drum shaft 78.

Spring 148 also helps maintain the drum components in assembly. Drum shaft locking lever 100 can then be released and its return spring 150 will return it to normal position which is unlatched from the drum shaft 78. The camera housing lid 76 is closed after the drum assembly 120 is inserted.

OPERATION

FIGURE 1 illustrates the drum camera in position and ready for operation.

However, the camera assembly 12 must first be brought into sharp focus and then loaded with a drum assembly 120 containing an unexposed strip of negative film. Focusing is accomplished by placing a frosted glass focusing disc insert 154, shown in FIGURE 2 into or onto the exit end of the lens tube 44. An incandescent bulb is temporarily placed in the socket in light box 52 to emit constant concentrated beams of parallel light. Parallel beams of light, such as the single beam 156 illustrated by a dot dash line in FIGURES 1 and 3 will bounce off of the spherical reflective surface of ball 20 on the type pallet 18 into a standard 8 mm. lens system 18, thence on through the lens tube 44 on to the focusing disc 154. By turning the crank 36 and rotating screw 28, the entire camera assembly 12 can be moved forward or backward, sliding on its base frame 22 until sharp focus is realized. Lowering and raising the front end of the camera assembly 12 by elevation screw 23 (FIGURE 3) enables aiming the lens system 47 precisely at the position to be occupied by the object to be photographed. Sharp focus is realized when the light beam 156 imparts a brilliant pin point of light at the center of the focusing disc 154.

A tiny spherical ball, which can be a ball bearing 20 is ideal to reflect the beam of light 156 into the lens system 47 because it concentrates the light, actually acting as a focusing agent, focusing the light to a pin point spot into the lens system. The intensity of light is such that ordinary incident light has little affect on the reflecting ability of the ball bearing 20 and, consequently, the drum camera assembly 12 can be used in normal room light as well as in a dark room. If it is convenient, a small spherical surface may be machined on the surface of the object being photographed and, of course, excellent pictures will result. A United States Patent No. 1,664,210 to Chester I. Hall contains a discussion of the use of a small spherical mirror to obtain recordings of movement and vibration by reflecting parallel beams of light and using, in effect a single point source of reflected light to record a time study of the desired movement. The Hall patent also illustrates how several directions of motion can be simultaneously recorded using only the single spherical reflector.

The ball bearing 20 is attached to the moving object being photographed, which in the exemplary disclosure is a type pallet 18. In experiments, it was discovered that the sperical surface gave not only excellent reflection qualities, but also permitted less critical light angles as well as camera angles.

After the camera 12 has been adjusted to sharp focus the focusing disc 154 is removed, a lens cap 158 placed over the end of lens 47 and a loaded film drum 120 is slipped on and secured to the spindle 78.

When focusing the drum camera 12, a standard incandescent light bulb was used because of the need of a constant light source, but after focusing has been accomplished and before inserting the film drum, the incandescent bulb is turned off by switch 68, is removed and replaced by a high speed, high peak type flash bulb 56.

The reason for the light box 52 will be obvious to those familiar with the art. If the light beam 156 were not in some way restricted, the light from the source 56 would be so intense that the specific motion being recorded would be lost in the flood of intense light beams entering the camera and the film strip 130 would be ruined from overexposure. Using the small pin hole 60 or the directing rod 62, the beams of light 156 can be trained directly at the spherical surface of the ball bearing 20 and the reflection of that concentration of beams from the sphere will write a very fine, distinct streak on the film strip 130.

The switch 116 (FIGURE 3) is then turned on to activate drum motor 110. Motor shaft 112 through gears 114 and 92 rotates the drum shaft 78 at a 3:1 ratio. A change in the gear ratio is possible, resulting in a change in the time constant base. Consequently, more or less writing time on the film strip 130 may be accomplished, because changing the r.p.m. of the film drum shaft changes the surface velocity of the film strip 130 and will determine the time constant of the reflected pin point of light on the film's emulsion surface. For example, at a surface speed of 500 inches per second, ½ linear inch on the film strip represents 1 ms. in time. Accordingly, the time base is changed only by changing the surface speed of the film strip 130 and the resulting trace or streak created by the pin point of reflected light will furnish an accurate time vs. travel distant graph on the film strip, for the device being photographed.

The motivating power for the object being photographed, which in this example is the type pallet 18 is a solenoid operator 72. Solenoid 72 and the flash bulb circuit are wired in a series circuit to a switch 70 which, in turn, is connected to an outside current source. Such connection can be through the motor power switch 116, for convenience of control. When the film drum assembly 120 is rotating, lens cap 158 is removed and, at the same time, switch 70 is tripped, setting the type pallet 18 in motion and at the same instant igniting the flash bulb 56. The light beam 156 emerges from the hole 60 or from the end of the directing rod 62 in the light box 52, strikes the reflecting surface of the ball bearing 20 which then bounces or reflects the light beam 156 into the camera assembly 12 where the focused beam burns a sharply defined trace or streak 170 into the emulsion surface of the film strip 130.

The preceding action takes place in a matter of a few seconds or less and thus the time that the lens cap 158 is off of the lens system 47, is not sufficient to fog the film strip 130 even when the camera 12 is operated in normal incident light. When the flash bulb 56 has ignited, the lens cap 158 is immediately replaced over the lens system 47 and the drum camera motor 110 is turned off.

The film strip 130 is then removed from the camera 12 and developed in accordance with standard darkroom procedure.

A developed film strip 130 is clearly shown in FIGURE 6, with the light streak 170 traced across its surface. In FIGURE 6, the light streak 170 is read from right to left and depicts the travel, impact and rebound characteristics of the photographed object (the type pallet 18). Section 172 represents the starting and acceleration characteristics, point 174 represents the impact point and section 176 represents the rebound path, indicating by the wavy line that vibration characteristics were experienced immediately after impact.

As will be noted in FIGURE 1, the drum camera assembly 12 has been designed very simply, with perfectly flat and aligned side surfaces, and being so designed, can be operated conveniently in any orientation, including the conventional horizontal manner illustrated in FIGURE 1, e.g., the camera assembly in FIGURE 1 should actually be rotated 90° clockwise about the axis of the lens tube to record a trace as shown in FIGURE 6.

The invention may be embodied in other specific forms without departing from the spirit or essential characteristics thereof. The present embodiment is therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Streak photography recording apparatus comprising:
   (a) a rotating drum shaped recording surface;
   (b) means to accomplish a momentary point light source directionally oriented;
   (c) a minute spherical reflecting means intermediate said source and said recording surface adapted to be movable in a desired direction directly representative of rapid movements of a workpiece for reflecting a point light beam from said point source to said recording surface, the movement of said reflected beam corresponding to the rapid movements of said reflecting spherical means in at least one plane;
   (d) means to cause movement of the workpiece; and
   (e) control means selectively operable during rotation of said drum shaped recording surface to coincidently activate said means to accomplish said momentary point light source and said means to cause movement of said workpiece.

2. Streak photography apparatus comprising:
   (a) means to provide a momentary point source of light beams directionally oriented toward an object, motion characteristics of which are to be recorded;
   (b) small spherical reflecting means to be affixed to the object being photographically recorded in the path of the beams from said light source means; means to actuate said object through a path of operative movement, the motion of which is to be recorded;
   (c) a high speed drum camera assembly having a drum with an internal cylindrical surface, means to rotate said drum, and means to direct and focus a reflection of said light source from said spherical reflecting means on said internal cylindrical surface of said drum;
      (1) said drum carrying a cylindrically arranged film strip with its emulsion surface adjacent said drum internal cylindrical surface to receive said focused light throughout the rotation of said drum; and
   (d) control means operative during drum rotation for coincidentally triggering said means to provide a momentary point source of light and causing operation of said actuating means.

3. A streak photography recording apparatus for recording the rapid movements of a workpiece resulting from its kinematic work transfer pairing with another workpiece, said workpiece being located in relatively inaccessible locations in a machine, said apparatus comprising:
   (a) means with an elongated member adapted to direct a point light source into the desired relatively inaccessible locations;
   (b) a small spherical reflector adapted to be rigidly secured to the workpiece, movements of which are to be recorded, at the said desired location;
   (c) a streak photography drum recording camera having
      (1) a barrel-shaped lens tube and lens system enabling accurate and close directional orientation to receive reflected light from said reflector,
      (2) a revolvable cylindrical means disposed to receive a focused beam of reflected light and including means for retaining a film strip adjacent a cylindrical surface, and;
      (3) means to rotate said cylindrical means at high speed; and
   (d) coordinated electrical control means selectively operative during rotation of said revolvable cylindrical means to simultaneously provide coincident illumination of said point source of light and movement of said workpiece into the path of a beam of light directed from said point source.

4. In the streak photography apparatus as defined in claim 3, said means adapted to direct a point source of light into relatively inaccessible locations comprising:
(a) a light box including a light proof enclosure, with an opening in at least one wall, means providing alternate mounting at a common location of an incandescent bulb and a flash bulb within said enclosure, said elongated member being a long tapered tube of clear transparent material having its large end secured in said opening and its small end extended away from said enclosure and means to gain rapid access to the interior of said enclosure for changing bulbs; and
(b) means for applying an electric current via said electrical control means to said means for mounting said bulbs.

5. In the streak photography apparatus as defined in claim 4, support means secured to said camera assembly and connected to said light box provide an adjustable light box support.

6. Streak photography apparatus comprising:
(a) means to provide a momentary source of parallel beams of light directionally oriented toward an object, rapid motion characteristics of which are to be photographically recorded;
(b) means to cause the object, motion of which is being recorded, to undergo operative movement;
(c) small spherical reflecting means adapted to be affixed to the object being photographically recorded in the path of the beams from said light source means;
(d) a high speed drum camera assembly having a housing, a cylindrical drum inside of said housing, means to rotate said drum, and a lens system;
(e) camera assembly support structure including means enabling directional orientation and focusing of the camera assembly as a unit to receive a beam of said light source reflected from said spherical reflecting means and to focus it at a predetermined spot inside of the camera housing coinciding with an internal cylindrical surface of said drum;
   (1) said drum comprising means to carry a cylindrically arranged film strip with the emulsion side of said strip disposed adjacent said internal drum cylindrical surface to receive light from said lens system throughout rotation of said drum; and
(f) control means operative during drum rotation for coincidentally triggering said means to provide a momentary source of light and causing actuation of said means affording operative movement to the object being photographically recorded.

7. A high speed drum camera assembly comprising;
(a) a camera housing;
(b) a lens system connected to said housing enabling external light to be directed to the interior of said housing;
(c) a cylindrical film mounting drum interior of said housing;
(d) power means to rotate said drum including quick disconnect means to releasably, rotatably mount said drum inside of said housing;
(e) said drum comprising a cylindrically surfaced member for supporting a strip of film cylindrically disposed about the drum axis with the film emulsion surface facing outward and disposed to rotate across the focal point of said lens system, and external annular retaining member of transparent material encasing said cylindrically disposed film strip, and end cap means disposed at both ends of said annular retaining member, said end cap means comprising a portion of said means to releasably rotatably mount said drum.

8. A high speed drum camera assembly comprising:
(a) a camera housing;
(b) a lens system secured to said housing;
(c) a drum shaft extending into said housing with its axis normal to the axis of said lens systems;
(d) means to drive said drum shaft;
(e) a film strip holding cylindrical drum means; and
(f) means including portions of said drum means and portions of said shaft enabling a quick disconnect releasable drive coupling of said drum means to said shaft with the emulsion surface location of the film strip in cylindrical surface intersection with the focus of said lens system.

9. A high speed camera as defined in claim 16, wherein said support means on said sleeve are end discs with central through bores enabling through passage of said shaft and coaxial reduced diameter portions enabling an end disc to be spigotted into the associated end of said sleeve.

10. A high speed drum camera as defined in claim 9 wherein expansible means interior of said sleeve clamp the film strip firmly against said internal cylindrical surface.

11. A high speed drum camera as defined in claim 9, wherein said means enabling a quick disconnect releasable drive coupling of said drum means to said shaft comprises:
(a) a transverse pin secured in the terminal end of said shaft interior of said camera housing;
(b) said through holes in said end discs;
(c) through cross slots in both said end discs and a blind slot transverse to the through slot on the outer side of at least one of said end discs; and
(d) spring means disposed between said drum and said camera housing to bias said drum away from the camera housing wall through which said shaft projects.

12. An apparatus for use in obtaining streak photography high speed motion characteristic records of machine components in relatively inaccessible and confined locations in a machine comprising:
(a) a drum camera having
   (1) a small rotatable film drum and
   (2) an extended gun barrel shaped lens tube adapted to be projected into relatively inacessible and confined machine locations;
(b) a point source of peaking light with tubular light directing means to concentrate and direct light beams toward desired locations in relatively inaccessible and confined machine locations;
(c) a minute spherical reflector secured at the relatively inaccessible location to a component of the machine whose movements are to be recorder; and
(d) means to synchronize the energizing of a peaking flash of light at said point source of light with the operative movement of the component being studied.

13. In streak photography apparatus as defined in claim 12, said means to synchronize the light and the operative movement of the component comprising:
(a) a manual switch;
(b) a trigger circuit to trigger an operative powered cycle of movement of the component being studied; and
(c) a circuit to energize said source of light;
(d) said two circuits being connected in series and energized by closing of said manual switch.

14. Streak photography apparatus comprising:
(a) means to provide a momentary source of parallel beams of light directionally oriented toward an object, rapid motion characteristics of which are to be photographically recorded;
(b) means to cause the object, motion of which is being recorded, to undergo operative movement;
(c) small spherical reflecting means adapted to be affixed to the object being photographically recorded in the path of the beams from said light source means;

(d) a high speed drum camera assembly having a housing, a drum comprising a small film strip cartridge inside of said housing, means to rotate said drum, comprising a rotating spindle and a quick release bayonet type coupling cooperating with portions of and securing said drum on said spindle and enabling quick removal and replacement of said combination drum-cartridge, and a lens system;

(e) camera assembly support structure including means enabling directional orientation and focusing of the camera assembly as a unit to receive a beam of said light source reflected from said spherical reflecting means and to focus it at a predetermined spot inside of the camera housing coinciding with a cylindrical surface of said drum;

(1) said drum comprising means to carry a cylindrically arranged film strip with the emulsion side of said strip disposed adjacent said drum cylindrical surface to receive light from said lens system throughout rotation of said drum; and (f) control means operative during drum rotation for coincidentally triggering said means to provide a momentary source of light and causing actuation of said means affording operative movement to the object being photographically recorded.

15. A high speed drum camera assembly comprising:
(a) a camera housing;
(b) a lens system secured to said housing;
(c) a drum shaft extending into said housing with its axis normal to the axis of said lens systems;
(d) means to drive said drum shaft;
(e) a film strip holding cylindrical drum means; and
(f) means including portions of said drum means and portions of said shaft comprising a spring loaded, quick disconnect, bayonet type coupling, enabling a quick disconnect releasable drive coupling of said drum means to said shaft with the emulsion surface location of the film strip in cylindrical surface intersection with the focus of said lens system.

16. A high speed drum camera assembly comprising:
(a) a camera housing;
(b) a lens system secured to said housing;
(c) a drum shaft extending into said housing with its axis normal to the axis of said lens systems;
(d) means to drive said drum shaft;
(e) a film strip holding cylindrical drum means comprising a small diameter cylindrical sleeve made from transparent material with an internal cylindrical surface against which a strip of film is maintained in cylindrical disposition, and support means on the ends of said sleeve enabling coaxial disposition and mounting of said drum means on said shaft; and
(f) means including portions of said drum means and portions of said shaft enabling a quick disconnect releasable drive coupling of said drum means to said shaft with the emulsion surface location of the film strip in cylindrical surface intersection with the focus of said lens system.

References Cited by the Examiner

UNITED STATES PATENTS

| | | | |
|---|---|---|---|
| 1,351,562 | 8/1920 | Foster | 240—1 |
| 1,664,210 | 3/1928 | Hall | 346—108 X |
| 2,229,721 | 1/1941 | Brandt | 346—108 X |
| 2,232,829 | 2/1941 | Ross | 346—1 |
| 2,480,178 | 8/1949 | Zinberg | 240—1 |
| 2,540,105 | 2/1951 | Dunbar et al. | 346—108 |
| 2,575,024 | 11/1951 | Mihalyi | 95—31 |
| 2,731,894 | 1/1956 | Leitz et al. | 95—31 |
| 2,871,088 | 1/1959 | Abell | 346—1 |
| 2,878,094 | 3/1959 | Dickinson | 346—107 |
| 2,960,380 | 11/1960 | Edgerton | 346—107 |

LEO SMILOW, *Primary Examiner.*

LEYLAND M. MARTIN, N. J. AQUILINO, J. W. HARTARY, *Examiners.*